United States Patent [19]

Schulze et al.

[11] Patent Number: 5,567,750
[45] Date of Patent: Oct. 22, 1996

[54] REDISPERSIBLE DISPERSION POWDER COMPOSITION

[75] Inventors: Joachim Schulze; Reinhard Haerzschel, both of Burghausen; Reiner Figge, Ampfing, all of Germany

[73] Assignee: Wacker-Chemie GmbH, Munich, Germany

[21] Appl. No.: 263,465

[22] Filed: Jun. 22, 1994

[30] Foreign Application Priority Data

Jun. 24, 1993 [DE] Germany .......................... 43 21 070.8

[51] Int. Cl.⁶ ...................................... C08K 3/00
[52] U.S. Cl. ................ 524/3; 524/4; 524/5; 524/6; 524/423; 524/425; 524/427; 524/436; 524/444; 524/447; 524/448; 524/451; 524/492; 524/493; 524/503; 525/57
[58] Field of Search ................... 524/503, 3, 4, 524/5, 6, 423, 425, 427, 436, 444, 447, 448, 451, 492, 493; 525/57

[56] References Cited

U.S. PATENT DOCUMENTS

| | | | |
|---|---|---|---|
| 2,748,103 | 5/1956 | Priest et al. | 260/77.5 |
| 3,784,648 | 1/1974 | Bergmeister et al. | 260/856 |
| 4,704,416 | 11/1987 | Eck et al. | 524/17 |
| 5,118,751 | 6/1992 | Schulze et al. | 524/503 |
| 5,155,167 | 10/1992 | Pinschmidt et al. | 525/60 |
| 5,234,968 | 8/1993 | Debus et al. | 524/503 X |

FOREIGN PATENT DOCUMENTS

| | | |
|---|---|---|
| 0228657 | 7/1987 | European Pat. Off. . |
| 0339371 | 11/1989 | European Pat. Off. . |
| 2049114 | 4/1972 | Germany . |
| 4034543 | 5/1991 | Germany . |
| 4030638 | 4/1992 | Germany . |

Primary Examiner—Judy M. Reddick
Attorney, Agent, or Firm—Burgess, Ryan and Wayne

[57] ABSTRACT

The invention provides a redispersible dispersion powder composition comprising a) a base polymer selected from the group consisting of vinyl ester polymers, styrene polymres, acrylate polymers and vinyl chloride polymers, b) from 2 to 15% by weight, based on the weight of the base polymer, of polyvinyl alcohol having a degree of hydrolysis of from 85 to 95 mol % and a Hoppler viscosity of from 2 to 25 mPa.s, c) from 3 to 30% by weight, based on the total weight of polymeric components, of fine antiblocking agent, and d) from 1 to 15% by weight, based on the weight of the base polymer, of an aminofunctional polyvinyl alcohol soluble in cold water and having a Hoppler viscosity of from 1 to 20 mPa.s and a saponification number of from 0 to 250, which comprises residues of aminofunctional vinyl units of the formula $CH_2=CH-(CH_2)_x-NH_2$, wherein x is a number of from 0 to 4.

The dispersion powder compositoin of the invention is particularly suitable for use in building materials, in particular, dry mortars comprising Portland cement as inorganic binder, and leads in these to increased adhesive strength of the mortar.

20 Claims, No Drawings

REDISPERSIBLE DISPERSION POWDER COMPOSITION

FIELD OF THE INVENTION

The invention relates to a redispersible dispersion powder composition which comprises an aminofunctional polyvinyl alcohol, and to the use thereof in building materials.

BACKGROUND OF THE INVENTION

Dispersion powders have been used for many years specifically in the building sector as polymer improvers of hydraulic setting systems. Substantial improvements in the properties of adhesion, abrasion resistance, scratch resistance and flexural strength are achieved by the addition thereof. In many cases, for example, in concrete repair, the increase in adhesive strength is the reason for using the dispersion powder.

Dispersion powders are produced by spray drying of aqueous polymer dispersions with the addition of polyvinyl alcohol and other additives. The free-flowing powder having particle sizes between 10 and 250 μm redisperses in water to again give the original dispersion having particle sizes between 0.1 and 5.0 μm. The redispersions should also be stable over a relatively long period of time, i.e. they should not tend to settle.

RELATED ART

The great advantage of dispersion powders compared with the liquid dispersions which can likewise be used as alternatives, is that it is possible to produce dry mortar mixtures which only have to be mixed with water at the building site. This brings many advantages such as increased occupational safety, safe handling and simple disposal of packaging. Such dispersion powders are described, for example, in EP-A 228,657 (U.S. Pat. No. 4,704,416) or DE-A 2,049,114 (U.S. Pat. No. 3,784,648). DE-A 4,030,638 (U.S. Pat. No. 5,118,751) describes the use of fully saponified copolymers of 1-alkylvinyl esters and vinyl esters in dispersion powders. A disadvantage of these known dispersion powders is that their addition to building materials such as concrete repair, mortars or building adhesives in many cases does not increase the adhesive strength to the desired extent.

It was, therefore, the object of the present invention to provide redispersible dispersion powder compositions whose addition improves the adhesive strength of the building materials without losing the advantages brought by the addition of dispersion powders such as improved abrasion resistance, scratch resistance and processing.

BRIEF SUMMARY OF THE INVENTION

It has now surprisingly been found that this object can be achieved by the incorporation of an aminofunctional polyvinyl alcohol in the redispersible dispersion powder. DE-A 4,034,543 (U.S. Pat. No. 5,155,167), U.S. Pat. No. 2,748,103 and EP-A 339,371 describe the preparation of aminofunctional polyvinyl alcohols and are incorporated herein by reference. The use of aminofunctional polyvinyl alcohols in dispersion powders has not been reported.

The invention provides a redispersible dispersion powder composition comprising a) a base polymer selected from the group consisting of vinyl ester polymers, styrene polymers, acrylate polymers and vinyl chloride polymers, b) from 2 to 15% by weight, based on the base polymer, of polyvinyl alcohol having a degree of hydrolysis of from 85 to 95 mol % and a Höppler viscosity of from 2 to 25 mPa.s, c) from 3 to 30% by weight, based on the total weight of polymeric components, of a fine antiblocking agent, and d) from 1 to 15% by weight, based on the base polymer, of aminofunctional polyvinyl alcohol soluble in cold water and having a Höppler viscosity of from 1 to 20 mPa.s and a saponification number of from 0 to 250, which comprises residues of aminofunctional vinyl units of the formula $CH_2=CH-(CH_2)_x-NH_2$ with $x=0$ to 4.

DETAILED DESCRIPTION OF THE INVENTION

Vinyl ester polymers suitable as base polymers a) comprise vinyl acetate homopolymers; copolymers of vinyl acetate with ethylene and/or vinyl chloride and/or other vinyl esters such as vinyl laurate, vinyl esters of versatic acid, vinyl pivalate and/or esters of maleic acid/fumaric acid; or homopolymers of vinyl esters of saturated $C_3$- to $C_8$-alkylcarboxylic acids or their copolymers with ethylene, vinyl chloride and/or further vinyl esters. The (meth) acrylate and/or styrene (co)polymers are derived from polymers or styrene and/or esters of acrylic acid and/or methacrylic acid (here denoted by (meth) acrylate)with straight-chain, branched or cyclic aliphatic alcohols having from 1 to 20 carbon atoms. Other styrene (co)polymers can be styrene/butadiene copolymers. Suitable vinyl chloride polymers are vinyl chloride/ethylene copolymers.

Preference is given to using vinyl acetate homopolymers, vinyl acetate/ethylene copolymers or copolymers of vinyl esters of saturated $C_3$- to $C_8$-alkylcarboxylic acids and ethylene comprising from 1 to 40% by weight of ethylene and from 0 to 40% by weight of other vinyl esters selected from the group consisting of the vinyl esters of saturated $C_3$- to $C_8$-alkylcarboxylic acids and/or vinyl chloride; styrene/ acrylates such as styrene/butyl acrylate or styrene/ethylhexyl acrylate having a styrene content of from 1 to 70% by weight.

The component b) comprises preferably polyvinyl alcohols having a degree of hydrolysis of from 85 to 94 mol % and a Höppler viscosity, determined in a 4% solution, of from 3 to 25 mPa.s.

The proportion of antiblock agent c) is preferably from 4 to 20% by weight based on the total weight of the polymeric components. Particular preference is given to antiblocking agents having average particle sizes of from 0.1 tp 50 μm. Examples of antiblock agents are finely milled aluminum silicates, kieselguhr, pyrogenic silica, precipitated silica, colloidal silica gel, microsilica, calcium sulfate, kaolin, talc, cements, diatomaceous earth, calcium carbonate or magnesium hydrosilicates.

The aminofunctional polyvinyl alcohol soluble in cold water component d) can be characterized by the Höppler viscosity (measured in a 4% solution) and the saponification number SN (SN=consumption of mg KOH/1 g of substance). The saponification number includes the sum of the amount of vinyl acetate and isopropenyl acetate units. Preferably, the dispersion powder composition comprises an aminofunctional polyvinyl alcohol soluble in cold water and having a Höppler viscosity of from 2 to 15 mPa.s and a saponification number SN of from 2 to 250, preferably from 2 to 160.

In a particularly preferred embodiment, the aminofunctional polyvinyl alcohol soluble in cold water d) is a polymer comprising from 0 to 20 mol %, preferably from 0.1 to 15 mol %, of vinyl acetate residues, from 35 to 95 mol %, preferably from 70 to 95 mol %, of vinyl alcohol residues, from 1 to 15 mol %, preferably from 2 to 10 mol %, of residues of aminofunctional vinyl units of the formula $CH_2=CH-(CH_2)_x-NH_2$ with x=0 to 4, x=1 (allylamine) being most preferred, from 0 to 30 mol %, preferably from 2 to 20 mol %, of 1-methylvinyl alcohol residues, and from 0 to 5 mol %, preferably from 0.01 to 3.0 mol %, of 1-methylvinyl acetate residues, the mol % figures in each case adding up to 100 mol %.

In a preferred embodiment, the sum of the molar contents of 1-methylvinyl alcohol (isopropenyl alcohol) residues and 1-methylvinyl acetate (isopropenyl acetate) residues should not exceed 30 mol % and preferably not exceed 25 mol %. The preparation of the aminofunctional polyvinyl alcohol d), soluble in cold water, can also be carried out by the processes disclosed in publications DE-A 4,034,543 (U.S. Pat. No. 5,155,167), U.S. Pat. No. 2,748,103 and EP-A 339,371, previously mentioned.

The redispersible dispersion powder composition preferably contains an amount of from 1 to 10%, based on the base polymer, of the aminofunctional polyvinyl alcohol soluble in cold water.

The redispersible dispersion powder composition can, if desired, contain further additives.

Thus, up to 30% by weight, based on the base polymer, of additives such as cement fluidizer, preferably sulfonate-containing condensation products of melamine or ketone and formaldehyde and/or naphthalenesulfonic acid-formaldehyde and/or phenolsulfonate/formaldehyde condensation products, can additionally be present.

If desired, up to 10% by weight, based on the base polymer, of fully saponified copolymers of 1-alkylvinyl esters having $C_1$- to $C_4$-alkyl groups and vinyl esters having a Höppler viscosity of from 1 to 25 mPa.s, determined in a 4% solution, can also be additionally present. The fully saponified copolymer preferably comprises vinyl acetate and from 5 to 25 mol % of 1-alkylvinyl ester, particular preference being given to the 1-alkylvinyl ester being isopropenyl acetate.

If desired, up to 2% by weight, preferably up to 1% by weight, based on the base polymer, of surface active substance(s) such as emulsifiers or wetting agents can also be additionally present. Examples of such additives are anionic surfactants and nonionic surfactants, for example alkylpolyglycols or ethylene oxide/propylene oxide copolymers.

If desired, up to 3% by weight, based on the base polymer, of thickeners, for example based on polyacrylic acid, can also be additionally present.

If desired, up to 2% by weight, based on the base polymer, of antifoaming agents can also be additionally present. Suitable antifoaming agents are commercially available products which have been proven suitable for use in hydraulically setting systems. Examples are silicone antifoaming agents or antifoaming agents based on liquid hydrocarbons.

To prepare the redispersion powder composition, the base polymer a) is used as an aqueous dispersion. The polyvinyl alcohol component b) is added to this dispersion. Preference is given to using an aqueous solution, making it possible to control the viscosity of the dispersion by means of the amount of water used. The aminofunctional polyvinyl alcohol d) is preferably used in aqueous solution and is mixed into the dispersion as such. These mixing procedures can be carried out in any order, the only important point being that a homogenous dispersion mixture is present. The cement fluidizer, fully saponified 1-alkylvinyl ester/vinyl ester copolymers, thickener, surface-active substances, antifoaming agents and any further additives are, if used, preferably added to the dispersion prior to drying the dispersion. However, it is also possible to mix these in later.

After mixing of the components, the dispersion is dried, preferably spray- or freeze-dried, more preferably spray-dried. Use can be made of known apparatus such as, for example, spraying through multi-fluid nozzles or by means of a disc into a drying gas stream which may or may not be heated. In general, temperatures above 250° C. are not used. The optimum temperature of the drying gas can be determined in a few experiments; temperatures above 60° C. are often preferred.

To increase the storage stability and, for example in the case of powders having a low glass transition temperature, to prevent caking and blocking, the powder obtained is admixed with the antiblock agent (anticaking agent) c) This is preferably carried out while the powder is still finely distributed, for example, still suspended in the drying gas. In particular, the anticaking agent is preferably metered into the drying apparatus separately but simultaneously with the dispersion.

The dispersion powder composition of the invention is particularly suitable for use in building materials such as tile adhesives, knifing fillers, gypsum building materials, lime mortars, cement mortars, rendering and, in particular, dry mortar, and these lead to an increased adhesive strength of the mortar in comparison with a corresponding dispersion powder which contains no aminofunctional polyvinyl alcohol. The composition of such hydraulically setting building materials is known. These compositions comprise a hydraulic binder and fillers, preferably in a weight ratio of from 1:0 to 1:1. Examples of hydraulic binders are Portland cement, fused alumina cement, plaster or anhydrite or mixtures thereof. The filler is preferably quartz sand in particular, having a grain size of from 0.1 to 4.0 mm, calcium carbonate or mixtures thereof. Usable additives in such compositions are materials such as cement fluidizers. Based on the dry weight, for example, of the dry mortar, the amount of the dispersion powder composition of the invention is preferably between 0.5 and 10% by weight. Prior to application, the dry mortar modified with the dispersion powder composition is mixed with water, the amount of water being dependent on the composition of the building materials.

The dispersion powder composition of the invention can also be successfully used as a binder in adhesive compositions or paints.

The following examples illustrate the technical advantage which is achieved by us of the redispersible dispersion powder composition of the invention.

EXAMPLES

MATERIALS USED:
Aqueous Dispersion LL 1
An aqueous dispersion stabilized with polyvinyl alcohol having a solids content of 50%, based on a vinyl acetate/ ethylene copolymer having a vinyl acetate content of 78% by weight and an ethylene content of 22% by weight from Wacker Chemie GmbH.

Aqueous Dispersion LL 2

An aqueous dispersion stabilized with polyvinyl alcohol having a solids content of 50%, based on an ethylene/vinyl chloride/vinyl laurate terpolymer having an ethylene content of 17% by weight, a vinyl chloride content of 70% by weight and a vinyl laurate content of 13% by weight from Wacker Chemie GmbH.

Aqueous Dispersion LL3

An aqueous dispersion stabilized with polyvinyl alcohol having a solids content of 50%, based on a styrene/acrylate copolymer having a styrene content of 50% by weight and a butyl acrylate content of 50% by weight from Wacker Chemie GmbH.

Polyviol M 13/140

Polyvinyl alcohol having a Höppler viscosity of 13 mPa.s in 4% solution, and a saponification number of 140 (degree of hydrolysis of 88 mol %) from Wacker Chemie GmbH.

Polyviol G 04/140

Polyvinyl alcohol having a Höppler viscosity of 4 mPa.s in 4% solution, and a saponification number of 140 (degree of hydrolysis of 88 mol %) from Wacker Chemie GmbH.

PME

Fully saponified copolymer of isopropenyl acetate and vinyl acetate (abbr. PME) having a Höppler viscosity of 2.5 mPa.s in 4% solution, and an isopropenyl acetate content of 20 mol % from Wacker Chemie GmbH.

Agitan 305 (a liquid, or the antifoaming agent based on a mixture of liquid hydrocarbons)

Antifoaming agent based on liquid hydrocarbons from M ünzing, Heilbronn.

Aminofunctional PVAL

N-PVAL 1:

Aminofunctional polyvinyl alcohol comprising 87.5 mol % of vinyl alcohol, 9 mol % of isopropenyl alcohol, 2.5 mol % of allylamine and a total of 1 mol % of vinyl acetate and isopropenyl acetate units. The polyvinyl alcohol has a Höppler viscosity (4% aqueous solution) of 8 mPa.s and a saponifcation number of 6.

N-PVAL 2:

Aminofunctional polyvinyl alcohol comprising 89.6 mol % of vinyl alcohol, 6 mol % of isopropenyl alcohol, 3.4 mol % of allylamine and total of 1 mol % of vinyl acetate and isopropenyl acetate units. The polyvinyl alcohol has a Höppler viscosit (4% aqueous solution) of 4.1 mPa.s and a saponification number of 8.

N-PVAL 3:

Aminofunctional polyvinyl alcohol comprising 87.5 mol % of vinyl alcohol, 9 mol % of isopropenyl alcohol, 2.5 mol % of allylamine and a total of 1 mol % of vinyl acetate and isopropenyl acetate units. The polyvinyl alcohol has a Höppler viscosity (4% aqueous solution) of 2.3 mPa.s and a saponification number of 6.

N-PVAL 4:

Aminofunctional polyvinyl alcohol comprising 85.0 mol % of vinyl alcohol, 7 mol % of isopropenyl alcohol, 7 mol % of allylamine and a total of 1 mol % of vinyl acetate and isopropenyl acetate units. The polyvinyl alcohol has a Höppler viscosity (4% aqueous solution) of 3.3 mPa.s and a saponification number of 9.

N-PVAL 5:

Aminofunctional polyvinyl alcohol comprising 87.0 mol % of vinyl alcohol, 7 mol % of isopropenyl alcohol, 5 mol % of allylamine and a total of 1 mol % of vinyl acetate and isopropenyl acetate units. The polyvinyl alcohol has a Höppler viscosity (4% aqueous solution) of 3.6 mPa.s and a saponification number of 7.

N-PVAL 6:

Aminofunctional polyvinyl alcohol comprising 95.0 mol % of vinyl alcohol, 4 mol % of allylamine and 1 mol % of vinyl acetate units. The polyvinyl alcohol has a Höppler viscosity (4% aqueous solution) of 3.6 mPa.s and a saponification number of 8.

N-PVAL 7:

Aminofunctional polyvinyl alcohol comprising 84.0 mol % of vinyl alcohol, 4 mol % of allylamine and 12 mol % of vinyl acetate units. The polyvinyl alcohol has a Höppler viscosity (4% aqueous solution) of 3.2 mPa.s and a saponification number of 114.

EXAMPLE 1

4000 parts by weight of Vinnapas dispersion LL 1, 2000 parts by weight of polyviol M 13/140 as 10% solution in water (10% based on LL 1 resin), 10% by weight of Agitan 305 (0.5% based on the weight of LL 1 resin), 800 parts by weight of N-PVAL as 10% solution in water (4% based on the weight of LL 1 resin) and 500 parts by weight of water were thoroughly mixed. The mixture was sprayed through a two-fluid nozzle. Air precompressed to 4 bar served as the atomization component; the droplets formed were dried co-currently with air heated to 125° C. The dry powder obtained was admixed with 10% by weight of commercial antiblocking agent (mixture of calcium magnesium carbonate and magnesium hydrosilicate).

COMPARATIVE EXAMPLE A

The preparation of the dispersion powder was carried out in the same way as in Example 1, but no N-PVAL 1 was used.

EXAMPLE 2

4000 parts by weight of Vinnapas dispersion LL 2, 1600 parts by weight of polyviol M 13/140 as 10% solution in water (8% based on the weight of LL 2 resin), 10 parts by weight of Agitan 305 (0.5% based on the weight of LL 2 resin), 600 parts by weight of N-PVAL 1 as 10% solution in water (3% based on the weight of LL 2 resin) and 500 parts by weight of water were thoroughly mixed. The mixture was sprayed through a two-fluid nozzle. Air precompressed to 4 bar served as the atomization component; the droplets formed were dried co-currently with air heated to 125° C. The dry powder obtained was admixed with 10% by weight of commercial antiblocking agent (mixture of calcium magnesium carbonate and magnesium hydrosilicate).

COMPARATIVE EXAMPLE B

The preparation of the dispersion powder was carried out in the same way as in Example 2 but no N-PVAL 1 was used.

EXAMPLE 3

The procedure of Example 2 was repeated, but 800 parts by weight of N-PVAL 2 as 10% solution in water (4% based on the weight of LL 1 resin) were used instead of 600 parts by weight of N-PVAL 1 as 10% solution in water (3% based on the weight of LL 2 resin).

COMPARATIVE EXAMPLE C

The procedure of Example 2 was repeated but 800 parts by weight of polyviol G 04/140 3 as a 10% solution in water (4% based on the weight of LL 1 resin) were used instead of 600 parts by weight of N-PVAL as 10% solution in water (3% based on the weight of LL 2 resin).

EXAMPLE 4

The procedure of Example 2 was repeated but 800 parts by weight of N-PVAL 3 as a 10% solution in water (4% based on the weight of LL 2 resin) were used instead of 600 parts by weight of N-PVAL 1 as 10% solution in water (3% based on the weight of LL 2 resin).

EXAMPLE 5

The procedure of Example 2 was repeated but 800 parts by weight of N-PVAL 4 as 10% solution in water (4% based on the weight LL 2 resin) were used instead of 600 parts by weight of N-PVAL 1 as 10% solution in water (3% based on the weight of LL 2 resin).

EXAMPLE 6

The procedure of Example 2 was repeated but 800 parts by weight of N-PVAL 5 as 10% solution in water (4% based on the weight of LL 2 resin) were used instead of 600 parts by weight of N-PVAL as 10% solution in water (3% based on the weight of LL 2 resin).

EXAMPLE 7

The procedure of Example 2 was repeated but 1600 parts by weight of N-PVAL 3 as 10% solution in water (8% based on the weight of LL 2 resin) were used instead of 600 parts by weight of N-PVAL 1 as 10% solution in water (3% based on the weight of LL 2 resin).

EXAMPLE 8

The procedure of Example 2 was repeated but 400 parts by weight of N-PVAL 3 as 10% solution in water (2% based on the weight of LL 2 resin) were used instead of 600 parts by weight of N-PVAL 1 as 10% solution in water (3% based on the weight of LL 2 resin).

EXAMPLE 9

The procedure of Example 2 was repeated but 800 parts by weight of N-PVAL 6 as 10% solution in water (4% based on the weight of LL 2 resin) were used instead of 600 parts by weight of N-PVAL 1 as 10% solution in water (3% based on the weight of LL 2 resin).

EXAMPLE 10

The procedure of Example 2 was repeated but 800 parts by weight of N-PVAL 7 as 10% solution in water (4% based on the weight of LL 2 resin) were used instead of 600 parts by weight of N-PVAL 1 as 10% solution in water (3% based on the weight of LL 2 resin).

EXAMPLE 11

4000 parts by weight of Vinnapas dispersion LL 3, 1600 parts by weight of polyviol M 13/140 as 10% solution in water (8% based on the weight of LL 3 resin), 10 parts by weight of Agitan 305 (0.5% based on the weight of LL 2 resin), 320 parts by weight of PME as 25% solution in water and 800 parts by weight of N-PVAL 6 as 10% solution in water (4% based on the weight of LL 2 resin) and 500 parts by weight of water were thoroughly mixed. The mixture was sprayed through a two-fluid nozzle. Air precompressed to 4 bar served as the atomization component; the droplets formed were dried co-currently with air heated to 125° C. The dried powder obtained was admixed with 10% by weight of commercial antiblock agent (mixture of calcium magnesium carbonate and magnesium hydrosilicate).

EXAMPLE 12

The procedure of Example 11 was repeated except N-PVAL 7 was used instead of N-PVAL 6.

EXAMPLE 13

The procedure of Example 11 was repeated except N-PVAL 7 was used instead of N-PVAL 6.

COMPARATIVE EXAMPLE D

The procedure of Example 9 was repeated but no N-PVAL 6 was used.

USE TEST:

Tensile Adhesion Test:

Apparatus:

Mortar mixture from Toni in accordance with DIN EN 196 part 1,
Concrete paving slabs B550 40×40 cm,
Trowel,
Template 4 mm,
Drilling machine with 55 mm diameter drill bit,
Two-component adhesive Stability Ultra from Henkel,
Pull-off clamps 55 mm diameter, layer thickness 5 mm, and
Herion pull-off apparatus in accordance with DIN 18156 part 1.

Recipe:

DIN mortar in accordance with DIN 1164:
900 g of Portland cement PZ 35F,
2700 g of standard sand=2 bags,
10.8 g of Agitan P801 (a mixture of hydrocarbons, fat derivatives and small amounts of silicon applied on an inert powder carrier material) from Münzing (0.3%),
90 g of dispersion powder, and
405 g of water.

Procedure:

The recipe components are mixed dry for 3 minutes at setting 1 of the mortar mixer. After addition of the water, the material was mixed for 3 minutes in the mortar mixer at setting 1. Then, using the trowel and with the aid of the template, the mortar was applied in a layer thickness of 4 mm onto concrete paving slabs conditioned at 23° C./50% relative humidity. The slabs were then stored (28 days in a standard environment 23° C./50% relative humidity).

One day before the test date, 6 test pieces were drilled out of each slab and the round pull-off clamps were then glued onto them using a 2-component adhesive.

The test pieces were then pulled off using the Herion pull-off apparatus using a loading rate of 250 N/sec.

The results of the use test are summarized in Table 1: a mean and standard deviation are given.

The amount of dispersion is given in parts by weight based on cement. (polymer/cement factor PC; PC=0.1 means 10% by weight of dispersion powder on amount of cement used).

Since the quality of the cement varies, only values within one series can be compared.

TABLE 1

| Dispersion powder | PC | Tensile adhesion strength 28 d standard environment [N/mm$^2$] |
| --- | --- | --- |
| Series 1 | | |
| Example 1 | 0.1 | 2.06 ± 0.04 |
| Comparative ex. A | 0.1 | 1.86 ± 0.08 |
| Example 2 | 0.1 | 2.12 ± 0.10 |
| Comparative ex. B | 0.1 | 1.83 ± 0.10 |
| Series 2 | | |
| Example 3 | 0.1 | 1.78 ± 0.04 |
| Example 4 | 0.1 | 1.78 ± 0.05 |
| Example 5 | 0.1 | 1.73 ± 0.04 |
| Example 6 | 0.1 | 1.74 ± 0.06 |
| Comparative ex. C | 0.1 | 1.60 ± 0.07 |
| Series 3 | | |
| Comparative ex. C | 0.1 | 1.61 ± 0.05 |
| Example 7 | 0.1 | 1.85 ± 0.04 |
| Example 8 | 0.1 | 1.75 ± 0.06 |
| Example 9 | 0.1 | 1.90 ± 0.04 |
| Example 10 | 0.1 | 1.86 ± 0.11 |
| Series 4 | | |
| Comparative ex. D | 0.1 | 1.85 ± 0.06 |
| Example 11 | 0.1 | 2.10 ± 0.07 |
| Example 12 | 0.1 | 2.22 ± 0.03 |
| Example 13 | 0.1 | 2.14 ± 0.06 |

We claim:

1. A redispersible dispersion powder composition comprising
   a) a base polymer selected from the group consisting of vinyl ester polymers, styrene polymers, acrylate polymers and vinyl chloride polymers;
   b) from 2 to 15% by weight, based on the weight of the base polymer, of a polyvinyl alcohol having a degree of hydrolysis of from 85 to 95 mol % and a Höppler viscosity of from 2 to 25 mPa.s;
   c) from 3 to 30% by weight, based on the total weight of polymeric components, of an antiblocking agent; and
   d) from 1 to 15% by weight, based on the weight of the base polymer, of an aminofunctional polyvinyl alcohol soluble in cold water and having a Höppler viscosity of from 1 to 20 mPa.s and a saponification number of from 0 to 250, which comprises residues of aminofunctional vinyl units of the formula $CH_2=CH-(CH_2)_x-NH_2$ wherein x is a number of from 0 to 4.

2. The redispersible dispersion powder composition as claimed in claim 1, wherein the base polymer
   a) is at least one polymer selected from the group consisting of:
      (i) vinyl acetate homopolymers,
      (ii) vinyl acetate/ethylene copolymers, wherein said group (ii) copolymers are comprised of from 1 to 40% by weight of ethylene, 0 to 40% by weight of vinyl esters of saturated $C_3$ to $C_8$ alkylcarboxylic acids and 0 to 40% by weight of vinyl chloride,
      (iii) copolymers of at least one vinyl ester of saturated $C_3$ to $C_8$ carboxylic acids and ethylene, wherein said group (iii) copolymers are comprised of from 1 to 40% by weight of ethylene and 0 to 40% by weight of vinyl chloride,
      (iv) styrene/acrylate copolymers having a styrene content of from 1 to 70% by weight and
      (v) mixtures of (i)–(iv).

3. The redispersible dispersion powder composition as claimed in claim 1, wherein the aminofunctional polyvinyl alcohol soluble in cold water d) is a polymer comprising:
   from 0 to 20 mol % of vinyl acetate residues,
   from 35 to 95 mol % of vinyl alcohol residues,
   from 1 to 15 mol % of residues of aminofunctional vinyl units of the formula $CH_2=CH-(CH_2)_x-NH_2$ wherein x=0 to 4,
   from 0 to 30 mol % of 1-methylvinyl alcohol residues, and
   from 0 to 5 mol % of 1-methylvinyl acetate residues.

4. The redispersible dispersion powder composition as claimed in claim 1, wherein the aminofunctional polyvinyl alcohol soluble in cold water d) is a polymer comprising:
   from 0.1 to 15 mol % of vinyl acetate residues,
   from 70 to 95 mol % of vinyl alcohol residues,
   from 2 to 10 mol % of residues of aminofunctional vinyl units of the formula $CH_2=CH-(CH_2)_x-NH_2$ wherein x=1,
   from 2 to 20 mol % of 1-methylvinyl alcohol residues, and
   from 0.01 to 3.0 mol % of 1-methylvinyl acetate residues.

5. The redispersible dispersion powder composition as claimed in claim 1, comprising up to 10% by weight, based on the base polymer, of a fully saponified copolymer of a 1-alkylvinyl ester having $C_1$ to $C_4$-alkyl groups and a vinyl ester having a Höppler viscosity of from 1 to 25 mPa.s determined in a 4% solution.

6. The redispersible dispersion powder composition as claimed in claim 1, further comprising up to 30% by weight, based on the base polymer, of a cement fluidizer selected from the group consisting of sulfonate-containing condensation products of melamine or ketone and formaldehyde, condensation products of naphthalenesulfonate and formaldehyde and condensation products of phenolsulfonate and formaldehyde; and/or
   up to 2% by weight based on the base polymer of emulsifiers or wetting agents; and/or
   up to 3% by weight, based on the base polymer, of thickeners; and/or
   up to 2% by weight, based on the base polymer, of an antifoaming agent.

7. A composition comprising a material selected from the group consisting of tile adhesives, knifing fillers, gypsum building materials, lime mortars, cement mortars, paints and dry mortars containing the redispersible powder composition of claim 1.

8. The redispersible dispersion powder composition of claim 2, wherein the aminofunctional polyvinyl alcohol soluble in cold water d) is a polymer comprising:
   from 0 to 20 mol % of vinyl acetate residues,
   from 35 to 95 mol % of vinyl alcohol residues,
   from 1 to 15 mol % of residues of aminofunctional vinyl units of the formula $CH_2=CH-(CH_2)_x-NH_2$ wherein x=0 to 4,
   from 0 to 30 mol % of 1-methylvinyl alcohol residues, and
   from 0 to 5 mol % of 1-methylvinyl acetate residues.

9. The redispersible dispersion powder composition of claim 2, wherein the aminofunctional polyvinyl alcohol soluble in cold water d) is a polymer comprising:
   from 0.1 to 15 mol % of vinyl acetate residues,
   from 70 to 95 mol % of vinyl alcohol residues, from 2 to 10 mol % of residues of aminofunctional vinyl units of the formula $CH_2=CH-(CH_2)_x-NH_2$ wherein x=1, from 2 to 20 mol % of 1-methylvinyl alcohol residues, and from 0.01 to 3.0 mol % of 1-methyvinyl acetate residues.

10. The redispersible dispersion powder composition of claim 2, additionally containing up to 10% by weight, based on the base polymer, of a fully saponified copolymer of a 1-alkylvinyl ester having $C_1$- to $C_4$-alkyl groups and a vinyl ester, having a Höppler viscosity of from 1 to 25 mPa.s determined in a 4% solution.

11. The redispersible dispersion powder composition of claim 3, additionally containing up to 10% by weight, based on the base polymer, of a fully saponified copolymer of a 1-alkylvinyl ester having $C_1$ to $C_4$-alkyl groups and a vinyl ester, having a Höppler viscosity of from 1 to 25 mPa.s determined in a 4% solution.

12. The redispersibte dispersion powder composition of claim 4, additionally containing up to 10% by weight, based on the base polymer, of a fully saponified copolymer of a 1-alkylvinyl ester having $C_1$- to $C_4$-alkyl groups and a vinyl ester, having a Höppler viscosity of from 1 to 25 mPa.s determined in a 4% solution.

13. The redispersible dispersion powder composition of claim 2 which contains a cement fluidizer in an amount of up to 30% by weight, based on the base polymer, said cement fluidizer being selected from the group consisting of sulfonate-containing condensation products of melamine or a ketone and formaldehyde, condensation products of naphthalenesulfonate and formaldehyde and condensation products of phenosulfonate and formaldehyde;

up to 2% by weight, based on the base polymer, of emulsifiers or wetting agents; and/or up to 3% by weight, based on the base polymer, of thickeners; and/or up to 2% by weight, based on the base polymer, of an antifoaming agent.

14. The redispersible dispersion powder composition of claim 3 which contains at least up to 30% by weight, based on the base polymer, of a cement fluidizer selected from the group consisting of sulfonate-containing condensation products of melamine or ketone and formaldehyde, condensation products of naphthalenesulfonate and formaldehyde and condensation products of phenolsulfonate and formaldehyde; and/or up to 2% by weight, based on the base polymer, of emulsifiers or wetting agents; and/or up to 3% by weight, based on the base polymer, of thickeners; and/or up to 2% by weight, based on the base polymer of an antifoaming agent.

15. The redispersible dispersion composition of claim 4 which contains a cement fluidizer in an amount of up to 30% by weight, based on the base polymer, said cement fluidizer selected from the group consisting of sulfonate-containing condensation products of melamine or ketone and formaldehyde, condensation products of naphthalenesulfonate and formaldehyde and condensation products of phenolsulfonate and formaldehyde; and/or up to 2% by weight, based on the base polymer, of emulsifiers or wetting agents; and/or up to 3% by weight, based on the base polymer, of thickeners; and/or up to 2% by weight, based on the base polymer, of an antifoaming agent.

16. The redispersible dispersion powder composition of claim 5 which contains a cement fluidizer in an amount of up to 30% by weight, based on the base polymer said cement fluidizer selected from the group consisting of sulfonate-containing condensation products of melamine or ketone and formaldehyde, condensation products of naphthalenesulfonate and formaldehyde and condensation products of phenolsulfonate and formaldehyde; and/or up to 2% by weight, based on the base polymer, of emulsifiers or wetting agents; and/or up to 3% by weight based on the base polymer, of thickeners; and/or up to 2% by weight, based on the base polymer, of an antifoaming agent.

17. A composition comprising a building material selected from the group consisting of tile adhesives, knifing fillers, gypsum building materials, lime mortars, cement mortars, paints and dry mortars containing a redispersible powder composition of claim 2.

18. A composition comprising a building material selected from the group consisting of tile adhesives, knifing fillers, gypsum building materials, lime mortars, cement mortars, paints and dry mortars containing a redispersible powder composition of claim 3.

19. A composition comprising a building material selected from the group consisting of tile adhesives, knifing fillers, gypsum building materials, lime mortars, cement mortars, paints and dry mortars containing a redispersible powder composition of claim 4.

20. A composition comprising a building material selected from the group consisting of tile adhesives, knifing fillers, gypsum building materials, lime mortars, cement mortars, paints and dry mortars containing a redispersible powder composition of claim 5.

* * * * *